US011070470B2

(12) United States Patent
Yu et al.

(10) Patent No.: US 11,070,470 B2
(45) Date of Patent: Jul. 20, 2021

(54) HOST ROUTER IN A VIRTUAL COMPUTING INSTANCE

(71) Applicant: VMware, Inc., Palo Alto, CA (US)

(72) Inventors: Jia Yu, Sunnyvale, CA (US); Xinhua Hong, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 374 days.

(21) Appl. No.: 16/254,067

(22) Filed: Jan. 22, 2019

(65) Prior Publication Data

US 2020/0236041 A1 Jul. 23, 2020

(51) Int. Cl.
*H04L 12/26* (2006.01)
*H04L 12/721* (2013.01)
*H04L 12/46* (2006.01)
*H04L 12/931* (2013.01)

(52) U.S. Cl.
CPC .......... *H04L 45/66* (2013.01); *H04L 12/4633* (2013.01); *H04L 49/70* (2013.01)

(58) Field of Classification Search
None
See application file for complete search history.

(56) References Cited

U.S. PATENT DOCUMENTS

| 2018/0097734 A1* | 4/2018 | Boutros | H04L 45/74 |
| 2018/0302243 A1* | 10/2018 | Li | G06F 9/455 |
| 2019/0036868 A1* | 1/2019 | Chandrashekhar | H04L 45/64 |
| 2020/0213225 A1* | 7/2020 | Han | H04L 61/00 |

* cited by examiner

*Primary Examiner* — Zewdu A Beyen
(74) *Attorney, Agent, or Firm* — Patterson + Sheridan, LLP

(57) ABSTRACT

The disclosure provides an approach for routing packets to services in a gateway device. The gateway device may be implemented as a virtual computing instance running in a host machine. The gateway device includes a host router configured to route packets to services coupled to ports of the host router in the gateway device based on a destination internet protocol (IP) address of the packets.

20 Claims, 3 Drawing Sheets

HOST ROUTER IN A VIRTUAL COMPUTING INSTANCE

BACKGROUND

Software defined networking (SDN) comprises a plurality of hosts in communication over a physical network infrastructure of a data center (e.g., on-premise data center or a cloud data center), each host having one or more virtualized endpoints such as virtual machines (VMs), containers, or other virtual computing instances (VCIs). These VCIs may be connected across the multiple hosts in a manner that is decoupled from the underlying physical network infrastructure. In one example, the VCIs may be connected to logical overlay networks that may span multiple hosts and are decoupled from the underlying physical network infrastructure.

A data center typically includes a gateway device that provides VCIs and other components in the data center with connectivity to a network that is external to the data center (e.g., a direct link, a local area network (LAN), a wide area network (WAN) such as the Internet, another type of network, or a combination of these). For example, the gateway device may manage external public IP addresses for VCIs and route traffic incoming to and outgoing from the data center. The gateway device also provides other networking services, such as firewalls, network address translation (NAT), dynamic host configuration protocol (DHCP), and load balancing. In some cases, the gateway device is implemented as a VCI in the data center, which may be referred to as an edge services gateway (ESG) VCI or ESG VM herein.

Typically, it is desirable to segregate different types of traffic at the ESG VCI. For example, it is desirable to segregate traffic for different types of services, and direct traffic to the appropriate destination for each of the different types of services. Accordingly, the ESG VCI includes a host switch, which acts like a Layer 2 physical switch, but is implemented in software to direct traffic to the appropriate destination within the ESG VCI. The host switch differs from a typical virtual switch in SDN, in that the host switch is configured to direct traffic based on addressing in packets corresponding to the underlay network, while a virtual switch is configured to also direct traffic based on addressing in packets corresponding to the overlay network. The host switch can include a number of ports. Each port may be implemented as a queue from which packets are directed to other components in the ESG VCI. Ports can be coupled to or monitored by different software components (e.g., applications, processes, etc.) in the ESG VCI. Each software component provides a service, such that when a packet is forwarded to that port, the software component or application further processes the packet based on the service being provided.

The host switch is configured to determine which port to forward packets of traffic to based on a combination of a destination medium access control (MAC) address and Virtual Local Area Network (VLAN) ID indicated in the headers of the packets. A VLAN is a broadcast domain that is partitioned and isolated at Layer 2. Accordingly, VLANs can be used to segment a Layer 2 network to separate traffic between different VLANs.

Thus, in one example, all traffic to the ESG VCI, regardless of the service the traffic is directed to, could have the same destination MAC address. The traffic could be segregated, however, by assigning traffic for different services to different VLANs. Therefore, a first packet for a first service may include a first MAC address and a first VLAN ID, and a second packet for a second service may include the same first MAC address and a different second VLAN ID. The host switch would forward the first packet to a first port associated with the first service based on the combination of first MAC address and first VLAN ID, and forward the second packet to a second port associated with the second service based on the combination of first MAC address and second VLAN ID.

However, it may not always be feasible to associate different types of traffic having different destinations with different VLANs. For example, in some use cases, such as a cloud data center in a public cloud network, packets do not include a VLAN tag. Accordingly, the host switch treats such packets without a VLAN ID as belonging to a default VLAN, such as VLAN 0. Thus, separate VLAN IDs are not available for packets, and instead all traffic for the data center practically has the same VLAN ID within the public cloud network. Since separate VLANs are not available, only destination MAC addresses remain for the host switch to differentiate between different types of traffic and direct them to different destinations. However, in public clouds there is often a limit imposed on the number of MAC addresses per VCI, which also limits the number of different destinations that a host switch can direct traffic to.

SUMMARY

Embodiments provide a system for providing gateway services. The system includes a host machine. The host machine includes a physical network interface, a forwarding element coupled to the physical network interface, and a virtual computing instance. The virtual computing instance includes an interface coupled to the forwarding element. The virtual computing instance includes a host switch configured to forward packets based on a destination medium access control (MAC) address of the packets. The virtual computing instance includes a host router comprising a plurality of router ports, the host router being configured to forward packets based on a destination internet protocol (IP) address of the packets. The virtual computing instance includes a plurality of service interfaces coupled to the plurality of router ports, each of the plurality of service interfaces associated with a software component configured to provide a service by processing packets.

The system is configured to operate as follows. The physical network interface is configured to receive a first packet comprising a first destination MAC address associated with the interface. The forwarding element is configured to forward the first packet to the interface based on the first destination MAC address. The interface is configured to forward the first packet to the host switch. The host switch is configured to forward the first packet to the host router based on the first destination MAC address. The host router is configured to forward the first packet to a first port of the plurality of router ports based on a first destination IP address of the first packet, the first port being associated with a first service interface associated with the first destination IP address. A software component associated with the first service interface is configured to process the first packet.

Further embodiments provide a method for operating a system as set forth above.

Further embodiments include a non-transitory computer-readable storage medium storing instructions that, when executed by a computer system, cause the computer system to perform a method for operating a system as set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach to routing traffic for different services in a gateway device (e.g., implemented as a VCI) using destination IP addresses in packets corresponding to the traffic, instead of solely based on destination MAC address and VLAN ID. In particular, embodiments herein provide an additional software component, referred to herein as a host router, coupled to the host switch and implemented within the gateway device that includes ports coupled to or monitored by different software components that provide different services in the gateway device. The host router is configured to route traffic to the ports associated with the services based on destination IP address.

Embodiments of the present disclosure provide an improvement to the functioning of the gateway device and the computing device overall by allowing the gateway device to support more services when the number of MAC address and VLAN ID combinations addressable at the gateway device are limited. Accordingly, a single gateway device can provide a greater number of services in a data center, thereby more efficiently utilizing compute resources at a single gateway device instead of having to use computing resources of multiple devices, and allowing simplified management of the gateway device. In addition, the ability to provide a greater number of services allows for a more feature rich and flexible data center. Therefore, embodiments of the present disclosure specifically solve the computer based issue of routing of traffic for services in a gateway when the number of MAC address and VLAN ID combinations addressable at the gateway device are limited.

Figure 1:
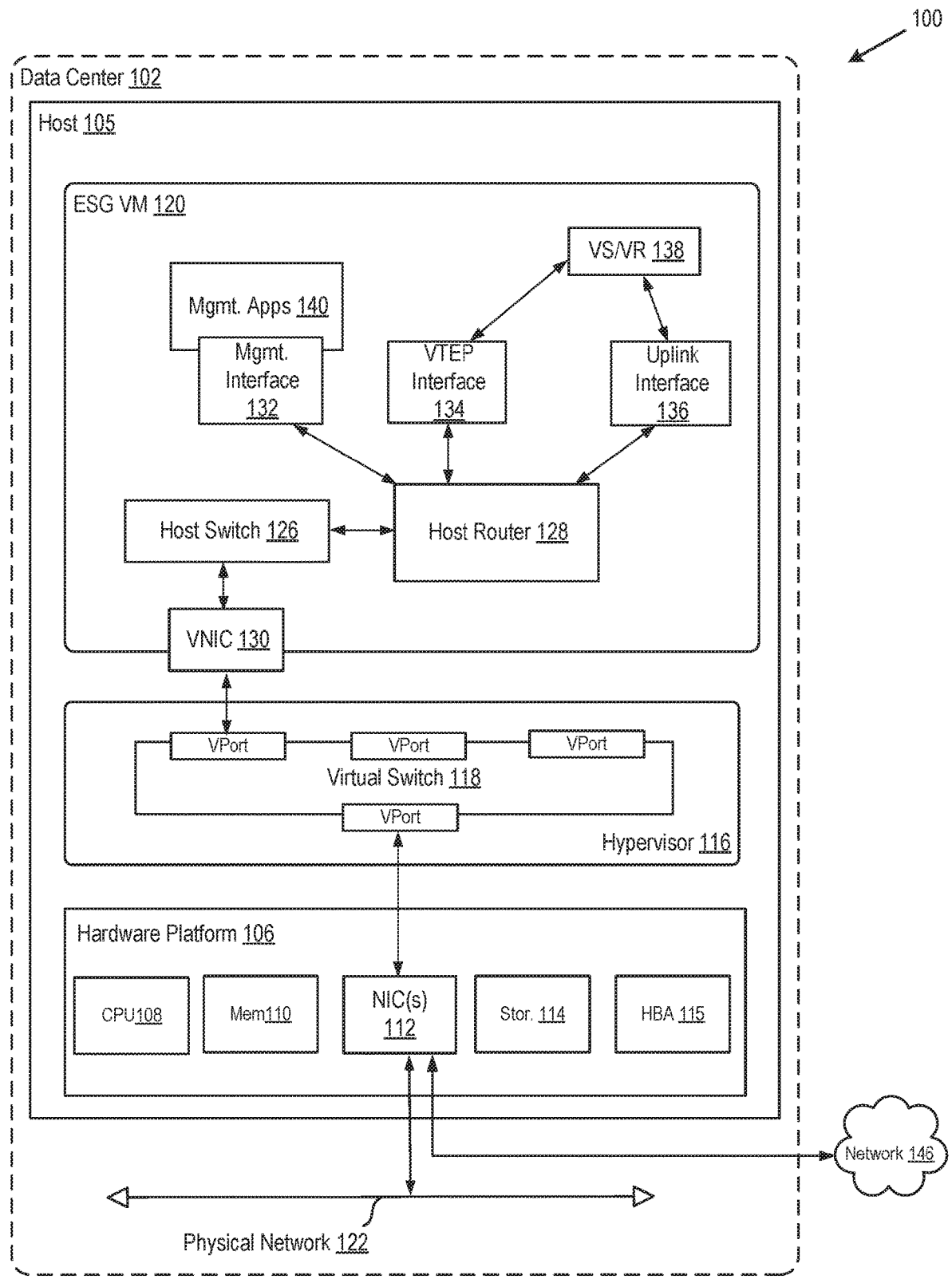
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Data center 102 may be an on-premises data center or a cloud data center. Data center 102 includes a host 105 coupled to a physical network 122. Though not shown, data center 102 includes additional hosts coupled to the physical network 122. Further, though not shown, the hosts in data center 102 may be coupled by multiple physical networks.

In addition, though not shown, data center 102 includes a management plane and a control plane coupled to one of the physical networks the hosts are coupled to. The management plane is concerned with receiving network configuration input from an administrator and generating desired state data that specifies how a logical network should be implemented in the physical infrastructure of data center 102. The control plane is concerned with determining the logical overlay network topology and maintaining information about network entities such as logical switches, logical routers, and endpoints, etc. The logical topology information is translated by the control plane into network configuration data that is then communicated to network elements of each host 105. The network configuration data, for example, includes forwarding table entries to populate forwarding tables at virtual switch(es) provided by the hypervisor (i.e., virtualization software) deployed on each host 105, forwarding table entries to populate forwarding tables at host switches, configuration information such as MAC addresses for interfaces such as VNICs and virtual interfaces and host routers, etc. The management plane and control plane each may be implemented as single entities or may be implemented as distributed or clustered applications or components. For example, a management plane may include multiple computing devices or VCIs that implement management plane functions, and a control plane may include multiple central (or distributed) controller computers, VCIs, or processes that implement control plane functions.

Host 105 may be constructed on a server grade hardware platform 106, such as an x86 architecture platform. For example, hosts in data center 102 may be geographically co-located servers on the same rack or on different racks in any arbitrary location in data center 102.

Host 105 is configured to provide a virtualization layer, also referred to as a hypervisor 116, that abstracts processor, memory, storage, and networking resources of hardware platform 106 into multiple virtual machines, e.g., VM 120. VMs on the same host 105 may run concurrently. The hypervisor architecture may vary. In some embodiments, virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine. Although part of the disclosure is described with reference to VMs, the teachings herein also apply to other types of VCIs, such as containers, Docker containers, data compute nodes, isolated user space instances, namespace containers, and the like.

Hypervisor 116 includes a virtual switch 118, which serves as a software-based interface between virtual machines, including VM 120, running on hosts 105, network interface card(s) (NIC) 112, as well as other physical resources available on host 105.

Each of the virtual machines running on host 105 may include a virtual network interface card (VNIC), such as VNIC 130 of VM 120, which is responsible for exchanging packets between the VM 120 and hypervisor 116. VNICs may be, in some cases, a software abstraction of a physical network interface card. VM 120 is connected to a virtual port (vport) provided by virtual switch 118, and virtual switch 118 is connected to NIC 112 (via one or more vports) to allow network traffic to be exchanged between virtual machines executing on host 105 and other network destinations such as virtual machines hosted by other hosts on network 122, or devices reachable via an external network such as network 146.

Figure 1A:
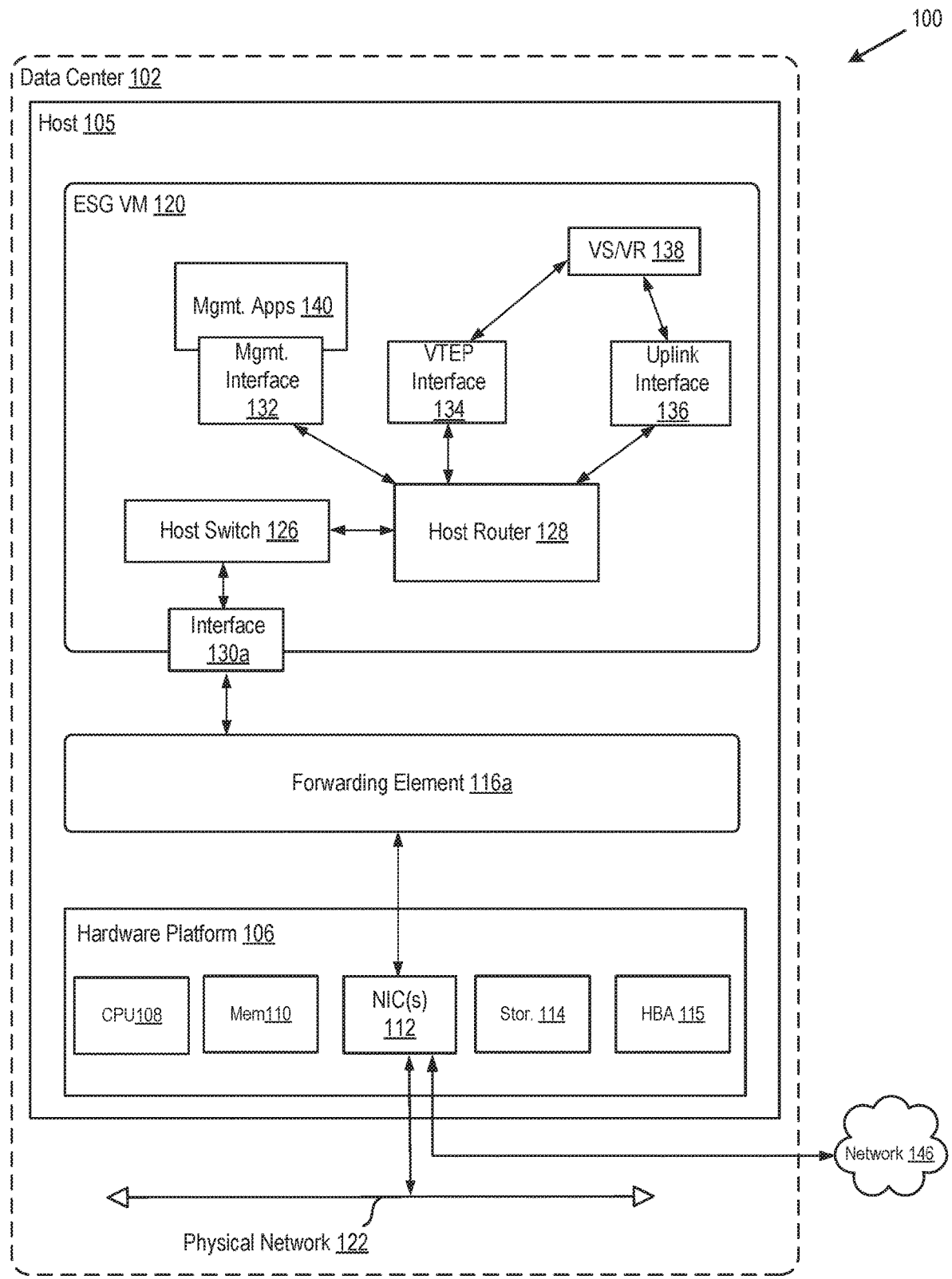
FIG. 1A depicts a block diagram of another computer system in which one or more embodiments of the present invention may be implemented.

It should be noted that host 105 may include a different forwarding mechanism for exchanging packets between NIC 112 and virtual machines executing on host 105 than hypervisor 116 implementing virtual switch 118. For example, as shown in FIG. 1A, host 105 may include some other forwarding mechanism 116a for exchanging packets between NIC 112 and virtual machines executing on host 105. Further, as shown in FIG. 1A, the VNIC 130 may instead be generally referred to as an interface 130a (e.g., an elastic network interface) that is responsible for exchanging packets between the VM 120 and forwarding mechanism 116a.

Hardware platform 106 of host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 and external network 146. Network interface 112 may include one or more network adapters or ports, also referred to as Network Interface Cards (NICs), for connecting to one or more physical networks.

Storage system 114 represents local persistent storage devices (e.g., one or more hard disks, flash memory modules, solid state disks, and/or optical disks). Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

As shown, VM 120 is configured to operate as a gateway device, and is accordingly also referred to herein as ESG VM 120. As discussed, ESG VM 120 is configured to provide networking services in data center 102, as well as connectivity to external network 146.

As shown, VNIC 130 of ESG VM 120 is further coupled to host switch 126 running in ESG VM 120. Though not shown, ESG VM 120 can include additional VNICs that couple between virtual switch 118 and host switch 126, or additional host switches. VNIC 130 is assigned a single MAC address (and similarly other VNICs coupled between virtual switch 118 and host switch 126 would be assigned their own separate MAC address), such as by a manager of the data center 102 using the management plane and pushed to the host 105 by the control plane, and therefore traffic destined for the ESG VM 120 may have a next hop destination MAC address of VNIC 130. Accordingly, when traffic is received at virtual switch 118 and/or NIC 112 with a destination MAC address of VNIC 130, it is forwarded to VNIC 130.

Host switch 126 is configured to receive ingress packets from VNIC 130 and further forward the packets to ports of host switch 126 based on the destination MAC address and VLAN ID in the packets, as discussed. In particular, host switch 126 is configured with a forwarding table entries by the central control plane that maps a combination of destination MAC address and VLAN ID to ports of host switch 126. Host switch 126 is further coupled to host router 128 running in ESG VM 120. For example, a port of host switch 126 is coupled to a port of host router 128.

The ports of host router 128 are each configured with the same MAC address as VNIC 130. In some embodiments, an agent (not shown) running on host 105 (e.g., at bootstrap time) learns the MAC address of VNIC 130, and reports the VNIC 130 and its MAC address to the management plane. The management plane then pushes the configuration of the MAC address of the ports of host router 128 to the control plane, which further pushes the configuration to host 105, thereby configuring the ports of host router 128 with the same MAC address as VNIC 130.

Host router 128 includes a number of ports associated with services. The ports of host router 128 can be coupled to or monitored by different software components (e.g., applications, processes, etc.) in the ESG VM 120. Each software component provides a service, such that when a packet is forwarded to that port, the software component or application further processes the packet based on the service being provided.

Host router 128, unlike host switch 126, is configured to determine which port to forward packets of traffic to based on a destination IP address indicated in the headers of the packets. Each of the ports of host router 128 associated with a service is further coupled to an interface associated with that service. For example, the interface may also be referred to as a virtual interface. As shown, ESG VM 120 includes a management virtual interface 132, VTEP virtual interface 134, and an uplink virtual interface 136 each coupled to a separate port of host router 128. In particular, host router 128 is configured with a routing table by the central control plane that maps IP addresses to ports of host router 128. For example, for the ingress direction, the next hop for a packet with a destination IP address of one of virtual interfaces 132-134 in the routing table is set as the router port to which the one of virtual interfaces 132-134 is connected. In another example, for the egress direction, a next hop IP or device route with exit interface to the router port coupled to host switch 126 is set in the routing table of host router 128.

In this example, each of virtual interfaces 132-136 may be assigned the same MAC address as VNIC 130, such that only a single MAC address need be assigned to ESG VM 120 to reach any of VNIC 130 and virtual interfaces 132-136. For example, when a user creates the virtual interfaces 132-136 via the management plane, the virtual interfaces 132-136 automatically inherit and are assigned the MAC address of VNIC 130 (e.g., learned as discussed using the agent). The management plane and control plane push this configuration of virtual interfaces 132-136 to host 105.

However, each of virtual interfaces 132-136 may be assigned different or unique IP addresses by the management plane and control plane. Accordingly, host router 128 can forward packets to each of virtual interfaces 132-136 individually based on their different IP addresses. Further, VNIC 130 can be associated, such as by the management plane and control plane, with the IP addresses of each of virtual interfaces 132-136, such that all traffic for virtual interfaces 132-136 is routed to VNIC 130.

Each of virtual interfaces 132-136 is associated with a different service. For example, traffic destined for a network external to the data center 102, such as network 146, may be directed to the uplink virtual interface 136. The traffic could be originated from within ESG VM 120 or correspond to a packet received external to ESG VM 120. In particular, the traffic would include a next hop destination MAC address of VNIC 130 and a destination IP address of the uplink virtual interface 136. In some embodiments, uplink virtual interface 136 is further configured to process a packet for routing to network 146, such as by providing route lookup functions and NAT functions to determine and set the next hop IP address for the packet. The uplink virtual interface 136 would further then route the packet back to host router 128, which based on the destination addressing (destination IP address) would route the packet to host switch 126. Host switch 126, based on the destination addressing (destination MAC address), would send the packet to virtual switch 118, which further sends the packet to NIC 112 (based on the destination MAC address), and then out to network 146.

Management traffic directed to software components or management applications 140 in the ESG VM 120 that provide management services may be directed to the management virtual interface 132. The traffic typically corresponds to a packet received external to ESG VM 120. In particular, the traffic would include a destination MAC address of VNIC 130 and a destination IP address of management virtual interface 132. Management apps 140 monitor the packets received on virtual interface 132 and further process the packets.

Traffic corresponding to a logical overlay network that is to be encapsulated/decapsulated as part of communication over the underlay network 122 may be directed to the VTEP virtual interface 134. For example, the VTEP virtual interface 134 may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

It should be noted that the term VTEP originally referred to a "VXLAN tunneling endpoint." However, while originally the term "VTEP" referred to "VXLAN" tunneling protocol, it is now often used regardless of the tunneling protocol, and therefore referred to herein as a "virtual" tunneling endpoint. This "backronym" can be misleading as the tunnel is not itself virtual, but does carry logical overlay networking traffic, which is sometimes referred to as virtual network traffic.

For example, the traffic could be originated from within ESG VM 120, meaning it may need to be encapsulated, or could correspond to a packet received external to ESG VM 120, meaning it may need to be decapsulated by VTEP virtual interface 134. When encapsulating the packet, the encapsulated packet may then be sent to the appropriate destination by passing the encapsulated packet back to host router 128, which forwards the packet to host switch 126, which forwards the packet on to VNIC 130, and out to virtual switch 118.

When decapsulating the packet, the decapsulated packet may be sent for processing to a virtual switch and/or virtual router (VS/VR) 138 implemented in ESG VM 120, which routes the packet based on its destination addressing. Typically, the packet will be directed to external network 146, and thus VS/VR 138 routes the packet to uplink virtual interface 136.

In certain embodiments, where data center 102 is a cloud data center, the cloud data center may provide an application programming interface (API) to create a virtual private cloud (VPC), but may not provide for the use of different VLANs. The VPC may allow one or more IP subnets to be created in the VPC. Accordingly, different types of traffic may be separated by assigning them to different subnets. For example, each of virtual interfaces 132-136 could be assigned an IP address in a different subnet. Accordingly, to create interfaces (e.g., interface 130a) for VMs in the VPC, IP addresses are allocated from the VPC to the VMs in host 105. When host 105 is onboarded into the cloud data center, interface 130a is created as associated with VM 120 and assigned multiple IP addresses (e.g., in different subnets) as discussed. Host router 128 allows only a single interface 130a to be used to segregate traffic for multiple different services provided in ESG VM 120. This is especially useful where there is a limit to the number of interfaces that can be associated with a VM in a cloud data center.

In an on-premises deployment, a VM may only support a limited number of VNICs, such as 10 VNICs, each with an associated MAC address. As more services (i.e., destinations) are added to the VM, the 10 VNIC limit may be reached. Therefore, forwarding data based on the MAC address alone of the VNICs could only be used for 10 services. With host router 128, more than 10 services can run in ESG VM 120.

Figure 2:
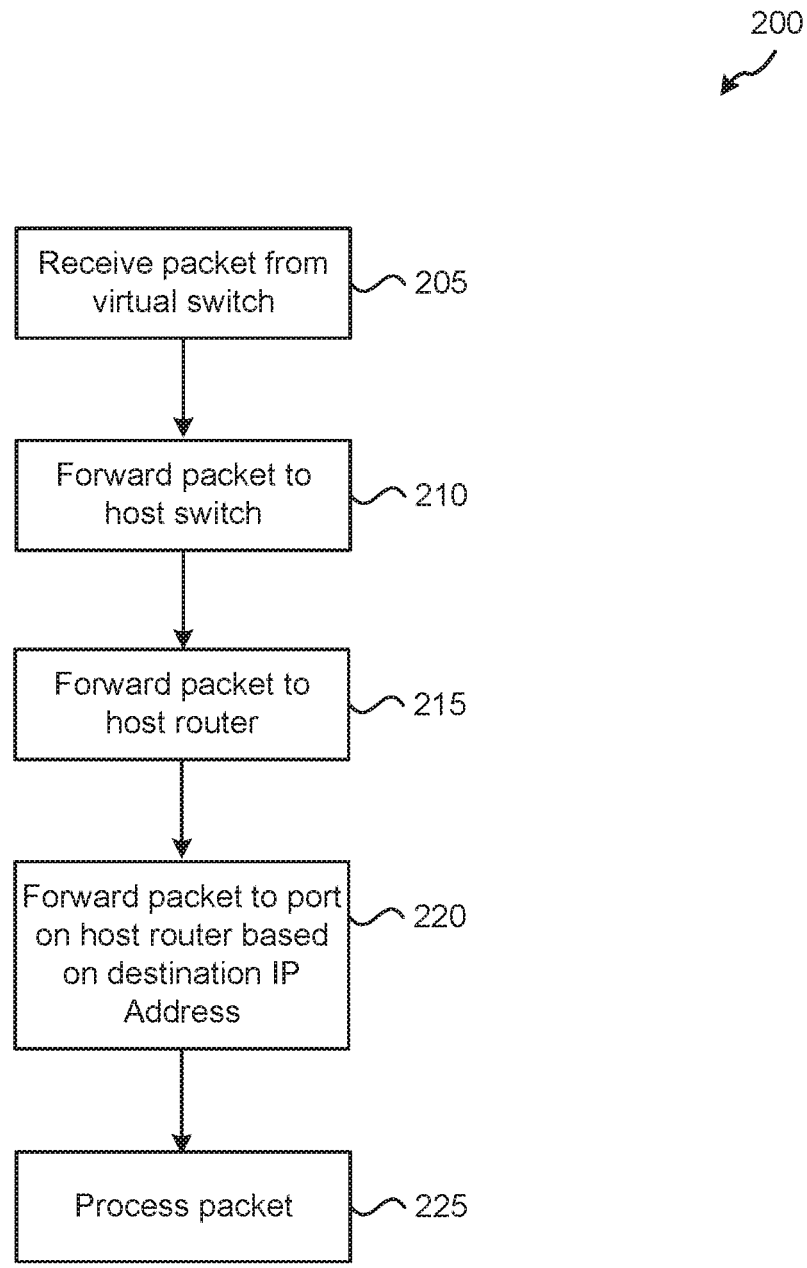
FIG. 2 depicts a flowchart of example operations for routing traffic to services in a gateway device according to one or more embodiments of the present invention.

FIG. 2 depicts a flowchart of example operations 200 for routing traffic to services in a gateway device according to one or more embodiments of the present invention.

At block 205, the VNIC 130 of ESG VM 120 receives a data packet from virtual switch 118. The data packet may have been received from another VM coupled to virtual switch 118, or NIC 112 via network 122 or 146. The data packet includes a destination MAC address corresponding to VNIC 130, and a destination IP address associated with a service (e.g., an interface associated with the service) of a plurality of services running in ESG VM 120.

At block 210, the VNIC 130 passes the data packet to host switch 126 running in ESG VM 120. At block 215, host switch 126, based on the destination MAC address being that of VNIC 130, forwards the data packet to host router 128.

At block 220, host router 128 determines the destination IP address of the data packet and based on the destination IP address forwards the data packet to a port on host router 128 coupled to the service (e.g., the interface associated with the service) associated with the destination IP address.

At block 225, the service processes the data packet.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A system for providing gateway services, the system comprising:
   a host machine comprising:
     a physical network interface;
     a forwarding element coupled to the physical network interface;
     a virtual computing instance comprising:
       an interface coupled to the forwarding element;
       a host switch configured to forward packets based on a destination medium access control (MAC) address of the packets;
       a host router comprising a plurality of router ports, the host router being configured to forward packets based on a destination internet protocol (IP) address of the packets; and
       a plurality of service interfaces coupled to the plurality of router ports, each of the plurality of service interfaces associated with a software component configured to provide a service by processing packets,
   wherein:

the physical network interface is configured to receive a first packet comprising a first destination MAC address associated with the interface;

the forwarding element is configured to forward the first packet to the interface based on the first destination MAC address;

the interface is configured to forward the first packet to the host switch;

the host switch is configured to forward the first packet to the host router based on the first destination MAC address;

the host router is configured to forward the first packet to a first port of the plurality of router ports based on a first destination IP address of the first packet, the first port being associated with a first service interface associated with the first destination IP address; and a software component associated with the first service interface is configured to process the first packet.

2. The system of claim 1, wherein:

the host switch is configured to forward a second packet having the first destination MAC address and a second destination IP address to the host router based on the first destination MAC address; and the host router is configured to forward the second packet to a second port of the plurality of router ports based on the second destination IP address, the second port being associated with a second service interface associated with the second destination IP address.

3. The system of claim 1, wherein the forwarding element comprises a virtual switch.

4. The system of claim 1, wherein a MAC address of each of the interface and the plurality of interfaces is the first destination MAC address.

5. The system of claim 1, wherein IP addresses of the plurality of service interfaces are associated with the interface.

6. The system of claim 1, wherein the plurality of service interfaces comprises an uplink interface associated with an uplink software component configured to provide network address translation (NAT) service.

7. The system of claim 1, wherein the plurality of service interfaces comprise a virtual tunnel endpoint (VTEP) interface associated with a VTEP software component configured to implement a logical overlay network by encapsulating and decapsulating packets.

8. A method for providing gateway services in a host machine comprising: a physical network interface; a forwarding element coupled to the physical network interface; and a virtual computing instance, the virtual computing instance comprising: an interface coupled to the forwarding element; and a host switch configured to forward packets based on a destination medium access control (MAC) address of the packets, the method comprising:

providing in the virtual computing instance a host router comprising a plurality of router ports, the host router being configured to forward packets based on a destination internet protocol (IP) address of the packets;

providing a plurality of service interfaces coupled to the plurality of router ports, each of the plurality of service interfaces associated with a software component configured to provide a service by processing packets;

receive, at the physical network interface, a first packet comprising a first destination MAC address associated with the interface;

forwarding, by the forwarding element, the first packet to the interface based on the first destination MAC address;

forwarding, by the interface, the first packet to the host switch;

forwarding, by the host switch, the first packet to the host router based on the first destination MAC address;

forwarding, by the host router, the first packet to a first port of the plurality of router ports based on a first destination IP address of the first packet, the first port being associated with a first service interface associated with the first destination IP address; and processing, by a software component associated with the first service interface, the first packet.

9. The method of claim 8, further comprising:

forwarding, by the host switch, a second packet having the first destination MAC address and a second destination IP address to the host router based on the first destination MAC address; and forwarding, by the host router, the second packet to a second port of the plurality of router ports based on the second destination IP address, the second port being associated with a second service interface associated with the second destination IP address.

10. The method of claim 8, wherein the forwarding element comprises a virtual switch.

11. The method of claim 8, wherein a MAC address of each of the interface and the plurality of interfaces is the first destination MAC address.

12. The method of claim 8, wherein IP addresses of the plurality of service interfaces are associated with the interface.

13. The method of claim 8, wherein the plurality of service interfaces comprises an uplink interface associated with an uplink software component configured to provide network address translation (NAT) service.

14. The method of claim 8, wherein the plurality of service interfaces comprise a virtual tunnel endpoint (VTEP) interface associated with a VTEP software component configured to implement a logical overlay network by encapsulating and decapsulating packets.

15. A non-transitory computer-readable storage medium comprising instructions that when executed by one or more processors of a host machine, cause the host machine to perform a method for providing gateway services in the host machine comprising: a physical network interface; a forwarding element coupled to the physical network interface; and a virtual computing instance, the virtual computing instance comprising: an interface coupled to the forwarding element; and a host switch configured to forward packets based on a destination medium access control (MAC) address of the packets, the method comprising:

providing in the virtual computing instance a host router comprising a plurality of router ports, the host router being configured to forward packets based on a destination internet protocol (IP) address of the packets;

providing a plurality of service interfaces coupled to the plurality of router ports, each of the plurality of service interfaces associated with a software component configured to provide a service by processing packets;

receive, at the physical network interface, a first packet comprising a first destination MAC address associated with the interface;

forwarding, by the forwarding element, the first packet to the interface based on the first destination MAC address;

forwarding, by the interface, the first packet to the host switch;

forwarding, by the host switch, the first packet to the host router based on the first destination MAC address;

forwarding, by the host router, the first packet to a first port of the plurality of router ports based on a first destination IP address of the first packet, the first port being associated with a first service interface associated with the first destination IP address; and processing, by a software component associated with the first service interface, the first packet.

16. The non-transitory computer-readable medium of claim 15, wherein the method further comprises:

forwarding, by the host switch, a second packet having the first destination MAC address and a second destination IP address to the host router based on the first destination MAC address; and forwarding, by the host router, the second packet to a second port of the plurality of router ports based on the second destination IP address, the second port being associated with a second service interface associated with the second destination IP address.

17. The non-transitory computer-readable medium of claim 15, wherein the forwarding element comprises a virtual switch.

18. The non-transitory computer-readable medium of claim 15, wherein a MAC address of each of the interface and the plurality of interfaces is the first destination MAC address.

19. The non-transitory computer-readable medium of claim 15, wherein IP addresses of the plurality of service interfaces are associated with the interface.

20. The non-transitory computer-readable medium of claim 15, wherein the plurality of service interfaces comprises an uplink interface associated with an uplink software component configured to provide network address translation (NAT) service.

* * * * *